United States Patent [19]
Clark

[11] 3,934,175
[45] Jan. 20, 1976

[54] POWER SURGE PROTECTION SYSTEM
[75] Inventor: Oscar M. Clark, Tempe, Ariz.
[73] Assignee: General Semiconductor Industries, Inc., Tempe, Ariz.
[22] Filed: Oct. 17, 1974
[21] Appl. No.: 515,690

Related U.S. Application Data
[63] Continuation-in-part of Ser. No. 420,850, Dec. 3, 1973, abandoned.

[52] U.S. Cl. .................... 317/16; 317/31; 317/61.5
[51] Int. Cl.² ......................................... H02H 9/06
[58] Field of Search ................ 317/16, 31, 61, 61.5

[56] References Cited
UNITED STATES PATENTS
2,789,254   4/1957   Bodle et al. ........................... 317/61
3,312,868   4/1967   Vodicka .................................. 317/61

Primary Examiner—James D. Trammell
Attorney, Agent, or Firm—Cahill, Sutton & Thomas

[57] ABSTRACT

A power surge on an incoming electrical line is predominantly dissipated through a spark gap and the remaining energy is grounded through a pn silicon junction to protect electrical equipment connected to the electrical line. A delay line intermediate the spark gap and the pn silicon junction segregates the operation of the two protection devices on a time basis, whereby they operate independently of one another.

10 Claims, 6 Drawing Figures

POWER SURGE PROTECTION SYSTEM

This application is a continuation-in-part of my application entitled "POWER SURGE PROTECTION SYSTEM", filed on Dec. 3, 1973, and assigned Ser. No. 420,850, now abandoned.

The present invention relates to electrical protection systems, and, more particularly, to systems for protecting electrical equipment against the destructive effects of fast rise time voltage pulses such as those generated by induced lightning and Electromagnetic Pulse (EMP) generated transient voltages.

Prior art devices for protecting electrical equipment against power surges have generally been one of two types, spark gaps or semiconductor devices. Spark gaps are quite effective in dissipating power surges, however, they cannot dissipate the full amount of the energy. The residual energy may be and often is of a sufficient level to cause damage to delicate voltage sensitive electronic equipment. Semiconductor devices are easily configured to dissipate a power surge to an acceptable level. However, the semiconductor devices are limited with respect to the upper level of energy that they can dissipate without being destroyed.

Realizing that spark gaps and semiconductor devices may be used in a complementary manner, some protection systems have been developed to incorporate the beneficial features of both. An example of such a system is shown in U.S. Pat. No. 3,480,832. It teaches the use of two series connected Zener diodes placed across an incoming line and in parallel with an arrester unit. The common point between the two Zener diodes is connected to an intermediate electrode within the arrester unit through a pules transformer. A magnetically variable resistor is in series with each incoming line between one terminal of the arrester unit and the non-common terminal of one Zener diode. In operation, a power surge will cause the Zener diodes to break down. The high rise time current through the Zener diodes will generate a potential across the intermediate electrode of the arrester unit and one of the other arrester unit electrodes, which potential ionizes the air gap within the arrester unit. The ionized air gap will permit an arc to form thereacross and dissipate the power surge. Simultaneously, the magnetic resistors will increase in resistance to prevent damage to the Zener diodes. An inductor cannot be used in place of the magnetic resistors due to the damage that would occur to the Zener diodes from the resulting transient voltage spike.

It is therefore a primary object of the present invention to protect electronic equipment from fast rise time voltage pulses such as induced lightning and electromagnetic pulse generated transient voltages.

Another object of the present invention is to provide a dual mode overvoltage protection system for electronic equipment.

Yet another object of the present invention is to provide a protection system for electronic equipment having a predetermined low level energy transfer and maximum clamping voltage regardless of the magnitude of the superimposed power surge.

A further object of the present invention is to provide a protection system for electronic equipment having independently operating elements.

These and other objects of the present invention will become apparent to those skilled in the art as the description thereof proceeds.

The present invention may be described with more specificity and clarity with reference to the following figures, in which.

Figures 3, 4, 5:
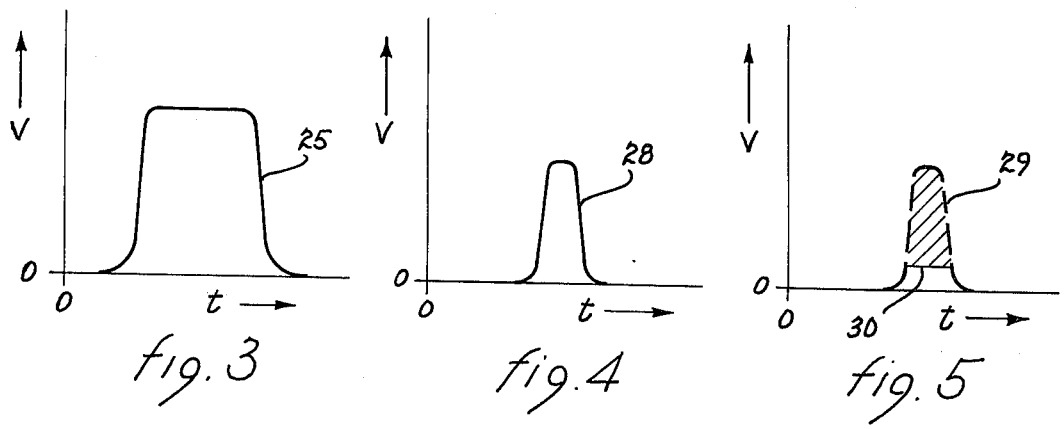
FIG. 3 illustrates a graphic representation of an incoming power surge.

FIG. 4 graphically illustrates the residual energy not dissipated by the spark gap.

FIG. 5 graphically illustrates the residual energy dissipated by the avalanche semiconductor element.

Figure 6:
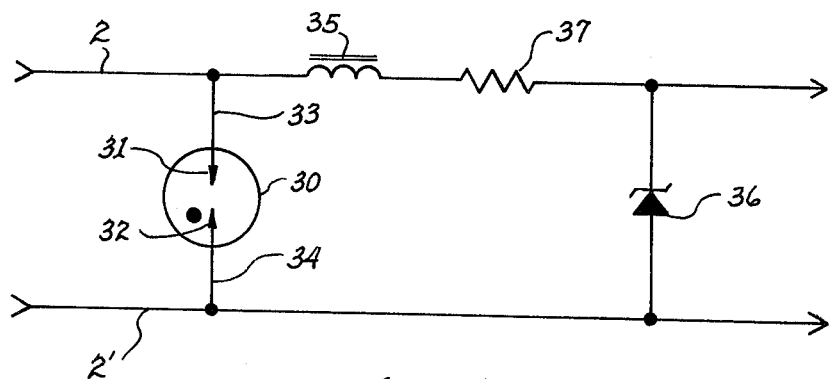

FIG. 6 illustrates a general form of the present invention.

Figure 1:
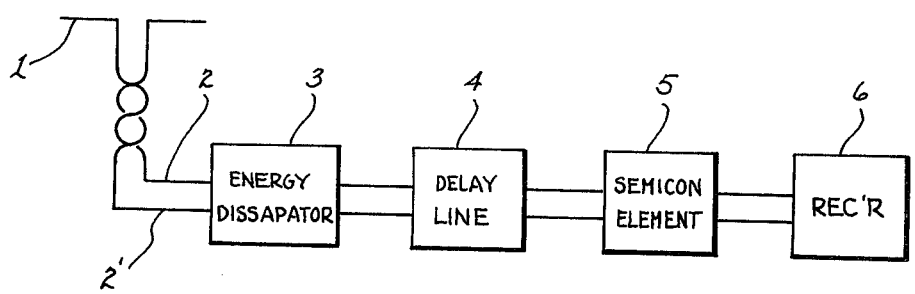
FIG. 1 illustrates a block diagram of the present invention.

Referring to FIG. 1, there is shown a block diagram of electronic equipment incorporating the present invention. An antenna 1 detects a transmitted signal and conveys it through electrical lines 2, 2' to a radio receiver 6 via means for dissipating energy, identified as apparatus 3, a delay line 4, and an avalanche semiconductor element 5. It is to be understood that antenna 1 is only representative of an electrical conductor and could be a communication line, or power cable; that apparatus 3 may be a spark gap or slow acting semiconductor device, such as a thyristor for certain electromagnetic pulse protection applications; and, that receiver 6 may be any type of electrical or electronic equipment. For reasons which will become more apparent as the description proceeds, the apparatus 3, delay line 4 and avalanche semiconductor 5 cooperate to inhibit a power surge experienced by electrical lines 2, 2' from reaching receiver 6 and causing damage to the receiver.

Figure 2:
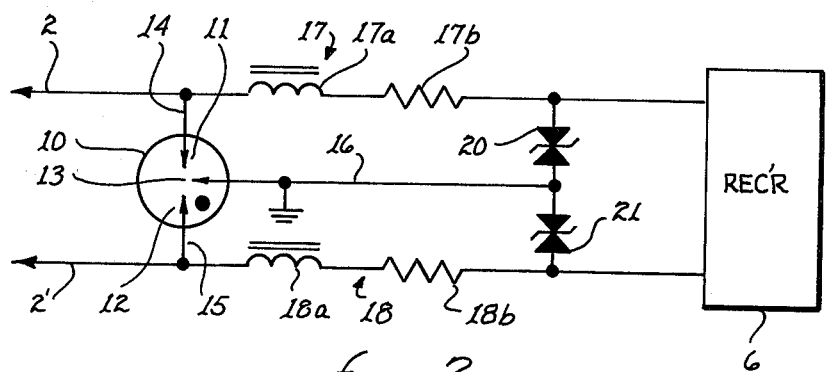
FIG. 2 illustrates the circuit of the present invention.

Apparatus 3 is configured as a three element spark gap across electrical lines 2, 2', as shown in FIG. 2. It includes a first electrode 11 connected to electrical line 2 by a conductor 14 and a second electrode 12 connected to electrical line 2' by conductor 15. A third grounded electrode 13 is disposed intermediate electrodes 11 and 12.

A pair of avalanche semiconductor elements 20 and 21 are connected in series across lines 2, 2'. The common point between the semiconductor elements is grounded and may be directly connected to electrode 13 as shown.

A delay line 17, formed by an inductor 17A and a resistor 17B, interconnects conductor 14 and the ungrounded terminal of avalanche semiconductor element 20. Similarly, a second delay line 18 interconnects conductor 15 and the ungrounded terminal of avalanche semiconductor element 21.

The receiver 6, or other electronic equipment, is connected across the ungrounded terminals of avalanche semiconductor elements 20 and 21. It is to be understood that the electronic equipment may be connected across only one of the avalanche semiconductors without departing from the teachings of the present invention.

In the preferred embodiment of the present invention, it has been determined that bipolar TransZorbs, which name is a registered trademark describing avalanche semiconductor elements and owned by the present assignee, are particularly suited for use with the present invention. The construction and installation of the TransZorbs are further described in an application for United States Letters Patent, Ser. No. 272,355, and filed on Aug. 14, 1972.

The operation of the present invention will be described with particular reference to the graphs shown in FIGS. 3–5. FIG. 3 graphically illustrates a power surge, or incoming pulse 25, which might occur on antenna 1 due to induced lightning or an Electromagnetic Pulse. The pulse duration may be less than 1 micro second or greater with an input voltage surge of 3 kilovolts or more. The incoming pulse, having a transient voltage of 3 kilovolts or more, will fire the spark gap in 10 to 15 nanoseconds. The resulting arc may occur across either electrodes 11 and 13 or 12 and 13 or both and the energy dissipated may be on the order of ten joules.

Because of the finite rise time of the power surge, and the delay contributed by the inductor, a pulse of energy 28, shown in FIG. 4, will be transmitted through one or both of the delay lines 17 and 18 to TransZorbs 20 and 21, respectively. The energy represented by pulse 28, which energy was not dissipated by spark gap 3, may be on the order of 1.5 joules. In example, the width of pulse 28 may be about 10 nanoseconds for power surges having a potential of 2 kilovolts or greater and impressed upon spark gaps known in the trade as 90v gas gaps.

The delay lines 17 and 18 serve to electrically separate the spark gap 3 from the TransZorbs 20 and 21 by preventing the TransZorbs from clamping the pulse voltage of the incoming pulse 25 below a value necessary to fire the spark gap. In addition, the delay lines 17 and 18 reduce the slope of pulse 28 impressed upon the TransZorbs. Thus, the voltages produced by the L di/dt effects are reduced.

For fast rise times of the transient voltages, the use of inductors 17A and 18A may suffice; however, for slower rise time voltages (in the order of 1000 volts per microsecond) the imposed voltage drop across the inductors may not suffice. The resistors 17B and 18B, however, produce sufficient voltage drops at slow rise times to limit the damping voltage of the TransZorbs to allow the gas gap to attain break down. The inductors 17A and 17B electrically isolate the TransZorbs more effectively at fast rise times and the resistors perform more effectively at slow rise times.

Summarizing, the bulk of the energy of the power surge impressed upon one or both of lines 2, 2' is dissipated by spark gap 3 and the residual energy is transmitted through one or both of the delay lines 17, 18 to one or both TransZorbs 20, 21. Thereby, the latter will not be damaged or destroyed should the power surge impressed upon lines 2, 2' be of any energy level substantially greater than their power tolerance capability.

FIG. 5 graphically illustrates a pulse of energy impressed upon one of the TransZorbs 20, 21. The shaded area 30 of the pulse represents the energy dissipated by the TransZorb. The dissipated energy may be on the order of 1.5 joules without causing damage to the TransZorb. The remainder of the pulse, identified by numeral 30, is of an insufficient voltage and energy level to cause damage to receiver 6. It is to be understood that the voltage and energy level of pulse 30 may be varied by incorporating differently rated TransZorbs or other avalanche semiconductor elements, or any semiconductor or combination of semiconductors biased in such a manner as to be current limiting.

In the present form of the present invention, as shown in FIG. 6, apparatus 3 is illustrated as a two element spark gap 30. Spark gap 30 includes a first electrode 31 connected to electrical line 2 by conductor 33 and a second electrode 32 connected to electrical line 2' by conductor 34. It is to be understood that spark gap 30 may be replaced by slow acting semiconductor devices, such as thyristors, for special situations.

Depending upon the requirements of the electrical equipment connected to the present invention (see FIG. 1), line 2' may or may not be grounded. Further, line 2 may be a single wire with line 2' representing a grounded or ungrounded part of the device incorporating the present invention.

An avalanche semiconductor element 36 is connected across lines 2, 2' in parallel with spark gap 30. In the preferred embodiment, a TransZorb is employed. However, other similar single pn silicon junction elements or varistors may be substituted without departing from the scope of the present invention.

At inductor 35, which may be formed by a coil or a length of wire, and a resistor 37 interconnects electrode 31 with one terminal of semiconductor element 36. The inductor and resistor provide the previously discussed delay in transmitting the pulse of energy 28 (see FIG. 4) to the semiconductor element 36.

In conclusion, the spark gap absorbs or dissipates the bulk of a power surge impressed upon the incoming line or lines and the avalanche semiconductor or semiconductors, separated in operating time from that of the spark gap by delay lines, clips the peak of the pulse passed by the spark gap to provide full protection to the attached electronic equipment regardless of the magnitude of the power surge.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A surge suppressor for dissipating power surges impressed upon an electrical line, said suppressor comprising:
   a. means for dissipating the bulk of the energy for a power surge on the electrical line, said dissipating means having an electrode connected to the electrical line;
   b. an avalanche semiconductor element connected in parallel with said dissipating means, said avalanche semiconductor element clipping the remaining energy of the power surge impressed upon the electrical line;
   c. a delay line comprising a series connected inductor and resistor for preventing said avalanche semiconductor element from clamping said dissipating means, said delay line being disposed intermediate said electrode of said dissipating means and said avalanche semiconductor element; whereby the bulk of the power surge impressed upon the electrical line is dissipated by said dissipating means and the remainder of the power surge is clipped by said avalanche semiconductor element.

2. The suppressor as set forth in claim 1 wherein said dissipating means includes a further electrode; said avalanche semiconductor element includes a first terminal connected to said delay line and a second terminal; and, means for interconnecting said further electrode and said second terminal.

3. The suppressor as set forth in claim 2 wherein said interconnecting means is grounded.

4. The suppressor as set forth in claim 1 wherein said dissipating means comprises a spark gap.

5. The suppressor as set forth in claim 4 wherein said avalanche semiconductor element comprises a pn silicon junction element.

6. The suppressor as set forth in claim 5 wherein said dissipating means comprises a slow acting semiconductor device.

7. The suppressor as set forth in claim 4 wherein said avalanche semiconductor element comprises a TransZorb.

8. A surge suppressor for dissipating power surges on a pair of electrical lines, said suppressor comprising:
   a. a spark gap having a first electrode connected to one of the pair of electrical lines, a second electrode connected to another of the pair of electrical lines and a grounded electrode common to said first and second electrodes for dissipating the bulk of a power surge impressed upon the pair of electrical lines;
   b. a pair of avalanche semiconductor elements for clipping the remaining energy of the power surge impressed upon the pair of electrical lines, each of said pair of avalanche semiconductor elements having a grounded terminal and an ungrounded terminal;
   c. a first delay line comprising a series connected inductor and resistor interconnecting said first electrode with the ungrounded terminal of one of said avalanche semiconductor elements; and
   d. a second delay line comprising a series connected inductor and resistor interconnecting said second electrode with the ungrounded terminal of another of said avalanche semiconductor elements; whereby, said first and second delay lines electrically segregate the operation of said spark gap and said pair of avalanche semiconductor elements to prevent said pair of avalanche semiconductors from clamping said spark gap.

9. The suppressor as set forth in claim 8 wherein said avalanche semiconductor elements comprise TransZorbs.

10. The suppressor as set forth in claim 9 wherein said avalanche semiconductor elements comprise TransZorbs connected back-to-back.

* * * * *